(Model.)
G. L. WITSIL.
ROLLER SKATE.
No. 266,002. Patented Oct. 17, 1882.
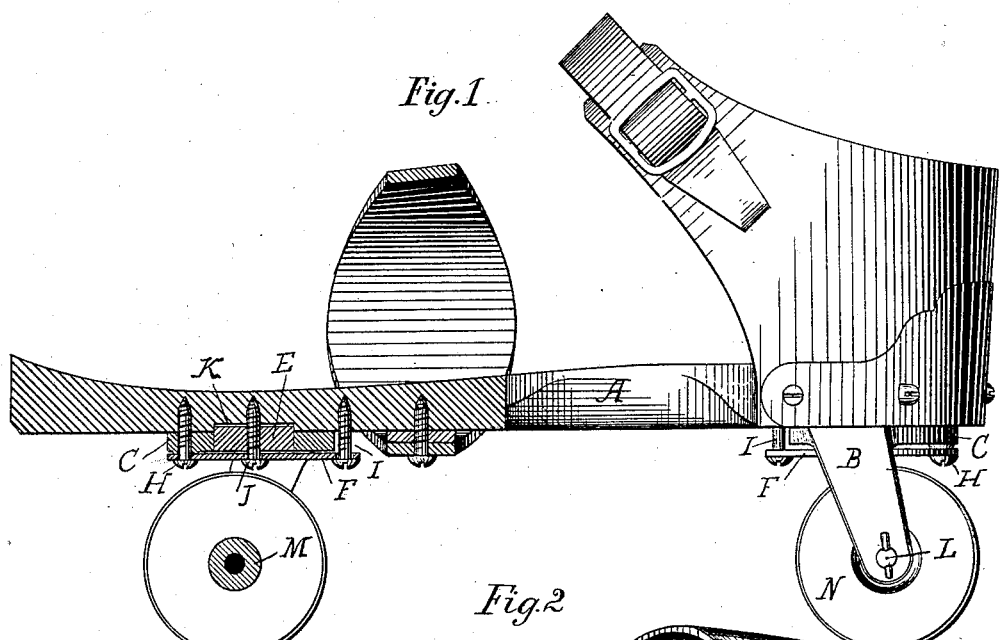
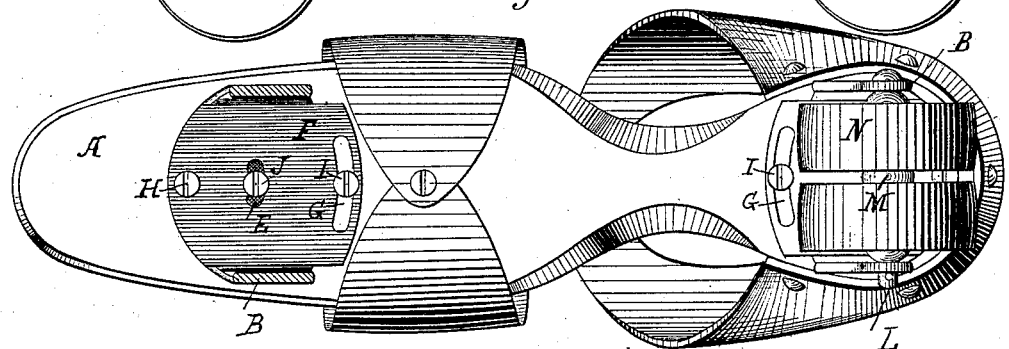
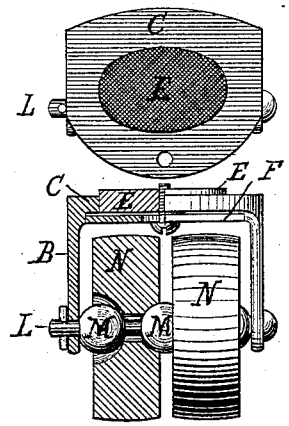
WITNESSES:
Clark Fisher
John Dolley Jr
George L. Witsil
INVENTOR
By his Attorneys,
W. C. Strawbridge
Bonsall Taylor

UNITED STATES PATENT OFFICE.

GEORGE L. WITSIL, OF PHILADELPHIA, PENNSYLVANIA, ASSIGNOR TO SAMUEL G. PAPE AND ALBION FOULDS, OF SAME PLACE.

ROLLER-SKATE.

SPECIFICATION forming part of Letters Patent No. 266,002, dated October 17, 1882.

Application filed January 28, 1882. (Model.)

*To all whom it may concern:*

Be it known that I, GEORGE L. WITSIL, of the city and county of Philadelphia, in the State of Pennsylvania, have invented an Improvement in Roller-Skates, of which the following is a specification.

My invention embodies certain improvements in the application of the rollers to the foot-stock of a roller-skate of such character as to enable the skater to make sharp turns and to aid in giving a very perfect lateral throw to the foot-stock with respect to the rollers.

The improvements are hereinafter described and claimed.

In the accompanying drawings, Figure 1 represents in side elevation a skate embodying my improvements, the front roller-truck being centrally sectioned in a vertical longitudinal plane. Fig. 2 is a bottom plan view of the same, the depending brackets of the front roller-truck being horizontally sectioned close to the base-plate and the front rollers being removed. Fig. 3 is a top plan view of one of the trucks, showing the rubber cushion; and Fig. 4 is a rear view, partially in section and partially in elevation, of a truck embodying my improvements.

Similar letters of reference indicate corresponding parts.

In the drawings, A represents the foot-stock of the skate, which is of any suitable material and construction.

There are, as usual, two trucks, which I make precisely alike. The description hereinafter given relates to but one of them.

B are the depending brackets of the truck, which branch downward from its base-plate C and carry the axle. This base-plate of the truck is centrally provided with an elliptical or other shaped opening, D, adapted to contain a rubber cushion, E, fitted therein and bearing against and partially mortised into the under surface of the foot-stock.

F is a truck guard-plate, fitted against the under surface of the base-plate of the truck between its depending brackets, the office of which is to incase and hold in place the rubber cushion, and also, as hereinafter explained, to provide means for limiting the lateral throw of the truck about its pivot. This plate is of greater length than the length of the base-plate of the truck, and it extends beyond said base-plate toward the center of the foot-stock, and as to such extended portion is provided with an arc-shaped guard-slot, G, which is clear of the base-plate of the truck.

Each truck is pivoted upon a pivot, H, fixed in the foot-stock and located centrally of the base plate and at that end of the same which is farthest from the center of the foot-stock.

I is a guard-stud entered through the guard-slot G and fastened in the under surface of the foot-stock. This guard-stud limits the lateral throw of the truck.

J is a supplemental guard-stud, entered through the guard-plate and passing through the rubber cushion into the foot-stock. It is a device auxiliary to the guard-stud I, and which may, if desired, be dispensed with.

Such being the method of construction and application of the trucks to the foot-stock, it is obvious that each truck is capable of a limited lateral movement about its pivot and with respect to the foot-stock, such movements being of advantage in the use of a roller-skate, as is well understood in their manufacture.

The cushion serves not only as a cushioning device against the weight of the skater upon the foot-stock, but also, by virtue of its embrace within the opening in the base-plate of the truck and in the recess or mortised seat K cut for it in the under face of the foot-stock, serves to limit the lateral throw of the truck, and also to return said truck after its deflection to either side to a central position with respect to the foot-stock.

Transversely fitted between the lower extremities of the depending brackets of the trucks is an axle, L, which is adapted to be provided with three or more spherical balls, M, of metal, glass, or other fit material, which are designed to afford a ball-and-socket attachment, so to speak, for the rollers N of the skate. Two of these rollers are applied to the axle of each truck, and are so reamed out from their opposite faces toward their centers upon the line of their axial openings that they fit around the balls, so to speak, and are hung or suspended thereupon and upon the axle, so as to be capable not only of a motion of revolution, but of an eccentric motion with respect to the axle and truck. The rollers revolve upon the balls and the balls revolve upon the axle, the entire device together enabling a compound swivel or gimbal movement, so to speak. It is essential that three balls at least should be employed, although when it is desired to separate the rollers to an exceptional width, as in making large sizes of skates, more than two balls may be applied centrally upon the axle between the rollers.

I have represented screws in the drawings as a means of attaching the various parts of the trucks to the foot-stock. I may, however, dispense with the screws and employ pins in lieu thereof.

A metallic plate may be applied to the foot-stock to prevent wear of the wood in the action of the lateral throw of the truck. Washers may be applied to lessen friction, if desired.

Having thus described my invention, it will be understood that the foot-stock rests upon springs, the rubber cushion acting in such capacity while likewise serving to regulate the amount of lateral vibration and to control and steady the lateral throw.

From the foregoing relationship of parts results the advantage that each truck is separately so adjusted as to be capable of independent movements irrespective of the other truck, whereby my roller-skate is adapted to accommodate itself without jar to the user and without noise to irregular floors, pavements, or the like.

This skate is well adapted for use in the turning of sharp curves, while its construction lessens the chances of breaking strains upon the trucks.

I do not confine myself to the exact form of detailed parts shown, as it is obvious that many formal changes can be made by a skilled mechanic without departure from the essential features of my invention.

Having thus described my invention, I claim—

1. In combination with the axle of a roller-truck, two rollers and three revolving balls placed respectively between and exterior to the rollers, as and for the purpose specified.

2. In combination with a truck which is pivoted to the foot-stock of a roller-skate, a rubber cushion partially seated in a recess in the under surface of the foot-stock and in a recess in the truck, substantially as and for the purposes described.

3. In a roller-skate, two rollers reamed out on both sides of their hollow axes, in combination with three anti-friction balls mounted upon the axle of said rollers, as and for the purposes set forth.

In testimony whereof I have hereunto signed my name this 20th day of January, A. D. 1882.

GEO. L. WITSIL.

In presence of—
J. BONSALL TAYLOR,
W. C. STRAWBRIDGE.